(12) United States Patent
Weir et al.

(10) Patent No.: US 7,300,590 B2
(45) Date of Patent: Nov. 27, 2007

(54) METHOD AND APPARATUS FOR SEPARATING OIL AND DEBRIS FROM WATER RUN-OFF

(76) Inventors: Robert K. Weir, 2390 Forest St., Denver, CO (US) 80207; Steve E. Esmond, 17 Evensen, Irvine, CA (US) 92602; Larry Quinn, 18612 Saugus Ave., Santa Ana, CA (US) 92705

( * ) Notice: Subject to any disclaimer, the term of this patent is extended or adjusted under 35 U.S.C. 154(b) by 0 days.

(21) Appl. No.: 11/181,594

(22) Filed: Jul. 14, 2005

(65) Prior Publication Data

US 2007/0187310 A1 Aug. 16, 2007

Related U.S. Application Data

(63) Continuation-in-part of application No. 10/681,672, filed on Oct. 7, 2003.

(51) Int. Cl.
*E03F 5/14* (2006.01)

(52) U.S. Cl. .......... 210/747; 210/767; 210/136; 210/162; 210/163; 210/170.03; 210/305

(58) Field of Classification Search .......... 210/747, 210/767, 136, 162, 163, 164, 170.03, 305, 210/307
See application file for complete search history.

(56) References Cited

U.S. PATENT DOCUMENTS

| | | | |
|---|---|---|---|
| 325,231 A * | 9/1885 | Badgley | 210/163 |
| 799,829 A * | 9/1905 | Church | 210/162 |
| 1,363,792 A * | 12/1920 | Johnston | 210/164 |
| 3,066,802 A * | 12/1962 | Loffler | 210/163 |
| 3,341,016 A * | 9/1967 | Paasche | 210/305 |
| 3,630,379 A | 12/1971 | Sharples | |
| 3,645,400 A | 2/1972 | Floyd | |
| 3,945,920 A | 3/1976 | Paszyc et al. | |
| 3,972,814 A | 8/1976 | Paszyc et al. | |
| 4,130,489 A * | 12/1978 | Black | 210/924 |
| 4,415,462 A * | 11/1983 | Finch et al. | 210/162 |
| 4,671,877 A | 6/1987 | Godbeer | |
| 5,304,311 A | 4/1994 | Codiglia | |
| 5,593,584 A | 1/1997 | Nurse, Jr. | |
| 5,653,880 A | 8/1997 | Mouton | |
| 5,779,888 A * | 7/1998 | Bennett | 210/162 |
| 5,791,291 A | 8/1998 | Strong et al. | |
| 5,820,762 A | 10/1998 | Bamer et al. | |
| 6,080,307 A | 6/2000 | Morris et al. | |
| 6,106,706 A * | 8/2000 | Roy et al. | 210/164 |
| 6,113,778 A | 9/2000 | Kemp et al. | |

(Continued)

OTHER PUBLICATIONS

Hydraulic Performance of Coanda-Effect Screens (Wahl, Tony L.) Hydraulic Engineering, vol. 127, No. 6, Jun. 2001.

*Primary Examiner*—Christopher Upton
(74) *Attorney, Agent, or Firm*—Ellen Reilly; John E. Reilly; The Reilly Intellectual Property Law Firm, P.C.

(57) ABSTRACT

A drainage system for separating oil and debris from water run-off wherein a chamber in the path of flow of the run-off includes a downwardly inclined screen and a debris-collecting fence beneath the screen to maintain separation between the debris and water; and an organic absorber may be positioned in the path of flow of the water beneath the screen to remove organic oils from the run-off.

17 Claims, 3 Drawing Sheets

U.S. PATENT DOCUMENTS

| | | |
|---|---|---|
| 6,200,484 B1 | 3/2001 | McInnis |
| 6,287,459 B1 | 9/2001 | Willaimson |
| 6,315,897 B1 | 11/2001 | Maxwell |
| 6,350,374 B1 | 2/2002 | Stever et al. |
| 6,361,248 B1 | 3/2002 | Maestro |
| 6,497,816 B2 | 12/2002 | Naddy |
| 6,797,161 B2 * | 9/2004 | Use et al. .................. 210/305 |
| 6,868,971 B2 * | 3/2005 | Phillips ....................... 209/17 |
| 7,138,048 B1 * | 11/2006 | O'Connor et al. .......... 210/162 |
| 2004/0226869 A1 * | 11/2004 | McClure et al. ............ 210/163 |

* cited by examiner

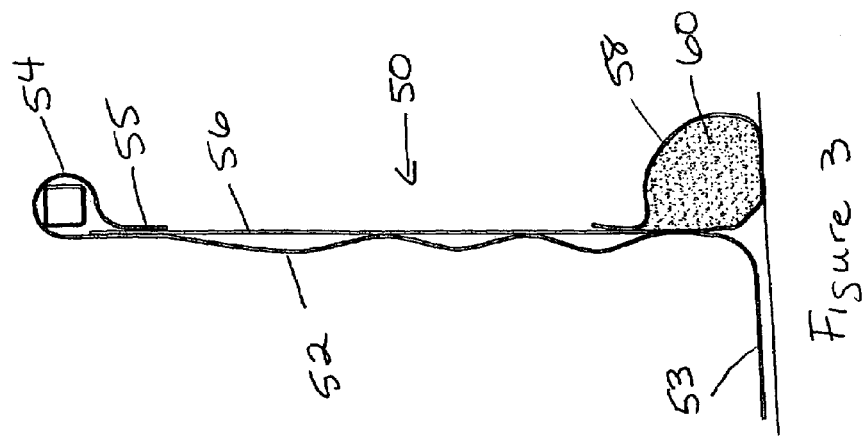
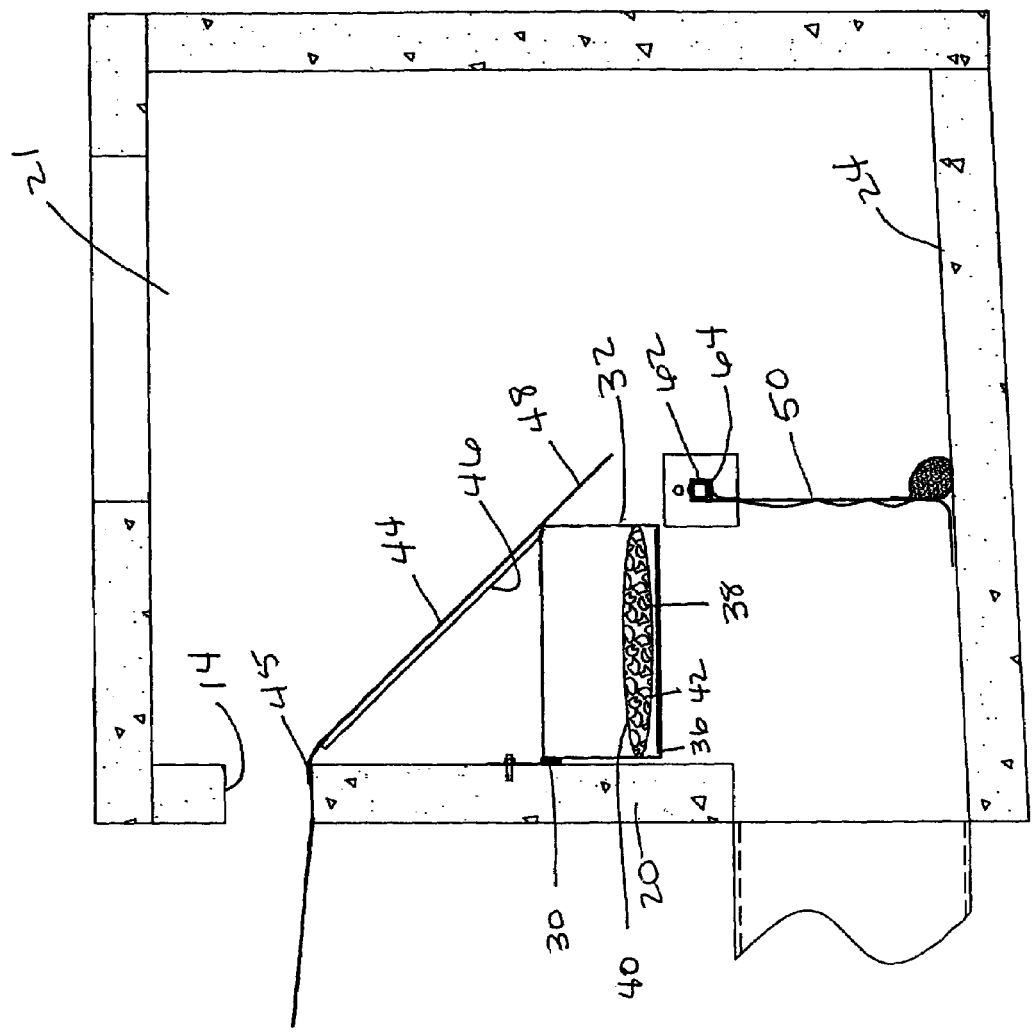

METHOD AND APPARATUS FOR SEPARATING OIL AND DEBRIS FROM WATER RUN-OFF

CROSS-REFERENCE TO RELATED APPLICATIONS

This application is a continuation-in-part of patent application Ser. No. 10/681,672, filed 7 Oct. 2003 for METHOD AND APPARATUS FOR SEPARATING OIL AND DEBRIS FROM WATER RUN-OFF by Robert K. Weir et al and incorporated by reference herein.

BACKGROUND

The embodiments and aspects set forth in this application relate to a novel and improved method and apparatus for removing organic matter and debris from urban run-off.

Environmental pollution has become a serious problem for all cities and towns across the country. Urban run-off containing debris and organic oils and other hydrocarbon materials are washing into rivers, bays and estuaries adjacent to the cities and towns. To date there has been little effort to contain this pollution. Recent Federal Regulations have begun to address the problem but, to date, the technology is not adequate. Further, a number of partially effective devices have been developed to catch debris and capture the floating oils to prevent them from moving out of containment and down to the discharge point, representative of such devices being set forth and described in U.S. Pat. No. 6,497,816 to W. Naddy, U.S. Pat. No. 6,361,248 to R. M. Maestro, U.S. Pat. No. 6,350,374 to R. R. Stever et al, U.S. Pat. No. 6,325,897 to K. Maxwell, U.S. Pat. No. 6,287,459 to J. K. Williamson, U.S. Pat. No. 6,200,484 to S. J. McInnis, U.S. Pat. No. 6,080,307 to J. F. Morris et al, U.S. Pat. No. 5,820,761 to J. M. Bamer et al, U.S. Pat. No. 5,653,880 to P. C. Mouton, U.S. Pat. No. 5,593,584, H. L. Nurse, Jr., U.S. Pat. No. 4,671,877 to B. C. Godbeer, U.S. Pat. No. 3,972,814 to A. Paszye et al, U.S. Pat. No. 3,945,920 to A. Paszye et al and U.S. Pat. No. 3,630,379 to T. D. Sharples.

Of the containment systems presently in use, swales or ponds adjacent to roads or parking lots are employed to capture storm run-off but are not very effective for containment of the run-off for organic removal. The technique of containment and absorption for organic material is flawed, also, due to the design of the water exit flow plate, since some oils flow through the holes in the plate and into the water course. In addition, the standing water in a pond is a serious problem and provides a breeding ground for mosquitos including those which may be infected by the West Nile virus.

Another important consideration is the storage capacity of the containment system. Typically, systems currently in use have little capacity for debris storage, extremely short operational life and tend to rapidly plug, overload and become dysfunctional. This problem is further compounded by the fact that municipalities lack the personnel and money to adequately maintain the systems properly.

Accordingly, there is a serious need for a containment system capable of completely separating the organic oils from the debris in urban run-off and in such a way that the separation can be carried out efficiently while avoiding standing water for any length of time, requires a minimum number of moving parts, and is readily conformable for use in existing drainage systems, such as, for example, storm drain systems presently in use. Moreover, there is an unmet need for a device capable of operating for long periods of time without maintenance and which can function until the entire device is filled with debris.

The following embodiments and aspects thereof are described and illustrated in conjunction with systems which are meant to be exemplary and illustrative, not limiting in scope.

SUMMARY

The embodiments set forth are exemplary and not for purposes of limitation. According to one aspect, a drain can be retrofit to existing drain systems and facilitate clean-out of solid debris and organic matter within the same run-off chamber without retarding the movement of the water through the drain system.

In one embodiment, a chamber or vault is disposed in the path of the run-off having an upper inlet which is in the path of flow of the run-off, a downwardly inclined screen extending from the inlet for advancement of the run-off and any debris thereacross, and a debris-collecting fence extends upwardly from the lower end of the chamber and is disposed beneath a lower edge of the screen, the fence including means for preventing the passage of debris through one side of the fence into the outlet while selectively permitting any water to pass through the fence toward the outlet and blocking the return flow of water from a second side of the fence to the first side. In another embodiment, an organic absorber is disposed in the path of run-off passing through the screen for the absorption of organic oils in the run-off, and the screen itself is composed of a wedge wire screen with the organic absorber traversing the width and length of the screen. The wedge wire screen is characterized by having tilted wire wedge wires to achieve highly efficient debris and particulate filtration.

The foregoing examples of the related art and limitations related therewith are intended to be illustrative and not exclusive. Other limitations of the related art will become apparent to those skilled in the art upon a reading of the Specification and a study of the Drawings. In addition to the exemplary aspects and embodiment described above, further aspects and embodiments will become apparent by reference to the Drawings and by study of the following Description.

BRIEF DESCRIPTION OF THE DRAWINGS

Exemplary embodiments are illustrated in referenced Figures of the Drawings. It is intended that the embodiments and Figures disclosed herein are to be considered illustrative rather than limiting.

FIG. 2 is a side view of an alternate embodiment to that of FIG. 1 illustrating an organic absorber;

FIG. 3 is an enlarged view of a debris-collecting fence illustrated in FIGS. 1 and 2.

DETAILED DESCRIPTION OF ONE EMBODIMENT

Figure 1:
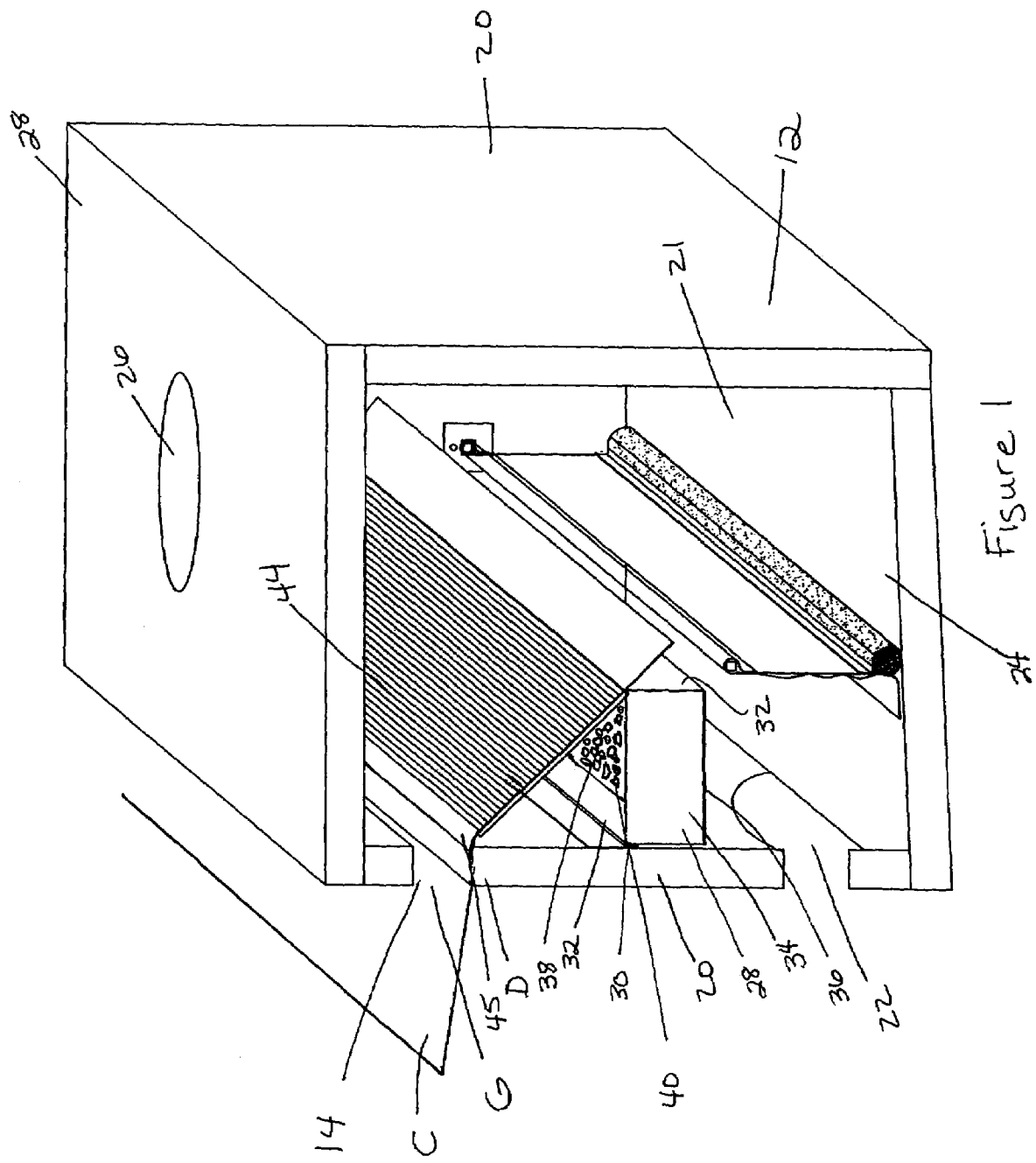
FIG. 1 is an isometric view with portions broken away of one embodiment.
Figure 4:
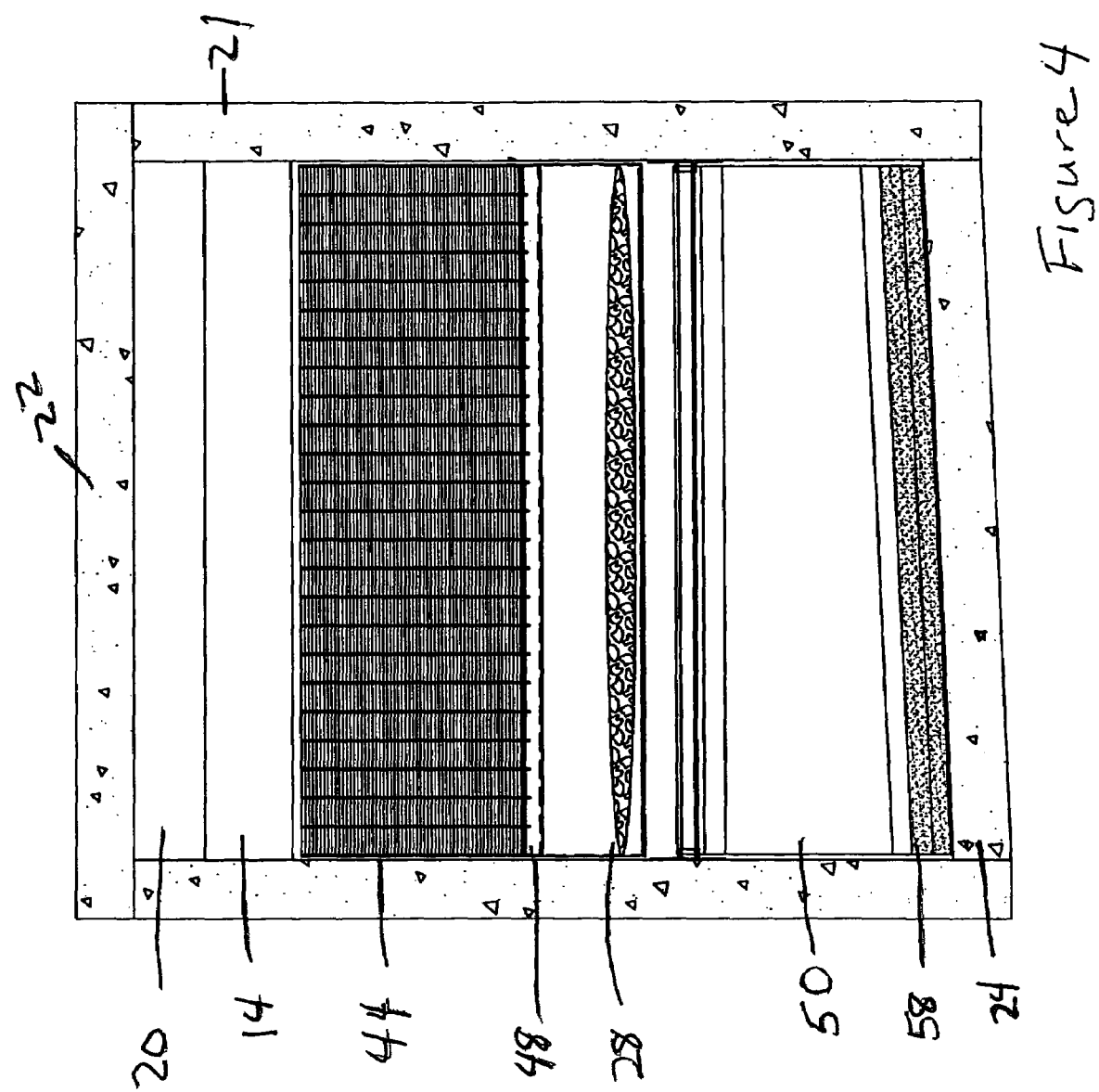
FIG. 4 is a front view of the interior of the apparatus.

Referring in more detail to the drawings, there is shown by way of illustrative example in FIGS. 1 to 4 a separator or drain apparatus 10 for separating debris and organic matter from water, such as, urban run-off flowing along a gutter G between a curb C and either side of a street and wherein storm drains are located at spaced intervals in the curb which flanks one side of the gutter G and is slightly raised with respect to the gutter G. In one embodiment, the apparatus 10 is readily conformable for use with existing curbs C and gutters G by installing a chamber or vault 12 beneath the curb C such that an upper inlet 14 is aligned with an opening or drain D which is typically provided with spaced metal bars, not shown, to prevent larger debris from passing into the chamber 12.

The chamber 12 is of generally rectangular configuration having vertical side walls 20 and opposite end walls 21, one of the side walls 20 including the inlet 14 and a lower outlet 22 directly above the bottom or floor surface 24. An upper flat removable manhole cover 26 is positioned in a top wall 28 to permit access to the interior of the chamber 12 for cleaning purposes in a manner to be described. The chamber may also have a varied configuration and the above example is by way of illustration and not limitation.

An open frame or basket 28 is suspended from one vertical wall 20 of the chamber 12 by a suitable bracket 30 approximately midway between the inlet 14 and the outlet 22. The basket 28 has opposite side walls 32 extending the length of the side wall 20, opposite vertical end walls or panels 34 and a perforated bottom panel 36. The top of the basket is open and an absorber pillow 38 is placed in the basket so as to rest on the perforated bottom 36, the pillow being dimensioned to completely cover the bottom panel. The absorber pillow 38 is comprised of an outer mesh-like or porous container or bag 40 filled with a hydrophobic material 42 which is typically used in oil spills. One composition of the absorber pillow is the Rubberizer absorbent material as manufactured by Haz-Mat Response Technologies, Inc. which is capable of absorbing virtually all oils and solvents present in the water run-off, but certainly other absorbent materials may be used.

A filter or screen 44 is mounted in the chamber and in one embodiment comprises a tilted wire wedge wire screen which has an upper curved lip 45 resting on a lower edge of the entry way or inlet 14 and inclines downwardly over the absorber box 28. The screen 44 is rigidified by the use of suitable support brackets or rods 46 on its underside spaced uniformly across the length of the screen between opposite end walls 21 of the chamber and with lower edges of the brackets resting on an upper end of outer side wall 32 of the absorber basket 28. The lower end of the screen includes a solid extension plate 48 in overhanging relation to the absorber basket 28 so that debris which is caught by the screen 44 will continue to advance downwardly over the plate 48 before it drops into the lower end of the chamber 12 beyond a debris fence 50 to be hereinafter described.

As best seen from FIG. 3, the debris fence 50 is comprised of a flexible sheet 52 having an upper loop 54 which defines a support pocket and has its terminal end 55 sewn to an upper end of a fabric filter sheet 56. The lower end of the sheet 56 is in the form of a loop 58 which is sewn together and encloses a flexible ballast 60, for example, by filling the loop or pocket 58 with sand or other high density material to provide the weight necessary for the bottom of the fence to rest firmly against the floor.

The sheet 52 in facing relation to the outlet 22 is composed, for example, of an impermeable membrane material, such as, a coated Nylon®. In turn, the fabric sheet 56 is of a material which will freely pass liquids but will block all debris and fine sediments larger than a particular size, for example, 200 microns. Such material is commonly available and typically manufactured as a non-woven fiber mat by companies, such as, U.S. Fabrics of Cincinnati, Ohio. The debris fence 50 has an upper support rod 62 extending through the upper pocket 54 and supported at opposite ends by generally U-shaped brackets 64 in the end walls 21 of the chamber so that the top of the debris fence 50 is directly under or behind the overhang 48 of the screen 44 and in close proximity to the bottom of the basket 28. The sheet members 52 and 56 are of a length to extend between the walls 21 and of a width to hang downwardly into contact with the floor of the chamber 12 and specifically the ballast pocket 58 resting firmly against the floor and the lower end 53 of the filter 52 extending at least a limited distance along the floor as shown and in a direction toward the outlet end 22. The nature of the ballast is such that the pocket 58 will be free to follow the contour of the floor notwithstanding any changes in flow, unevenness or bottom texture and thereby prevent any return or reverse flow of water from the outlet side of the fence into the membrane side past the ballast pocket 58.

In use, the water run-off is free to pass through the screen 44 and the absorber 38 into the collection area adjacent to the outlet 22. If the volume of run-off is sufficiently great, it will gradually rise in the collection area but will be blocked by the membrane 56 and ballast pocket 58 from passing into the debris storage side of the chamber. Any debris and sediment advancing along the screen 44 will be deposited into the debris storage side but will be effectively blocked from movement into the discharge side by the membrane 56 and the ballast pocket 58. Any residual water in the debris stored on the storage side of the chamber may gradually seep out and under the ballast pocket if there is no standing water in the discharge side. In that event, the fabric filter sheet 52 will block any passage of particulates down to 10 microns to 20 microns depending upon the mesh size of the filter.

The debris fence 50 accordingly serves a number of purposes: For example, but not by way of limitation, it allows large volumes of debris and sediment to be captured but not move out of the chamber; it allows residual water in the captured debris to be gradually removed from the storage side; and it prevents water from the discharge side from moving into the storage side and saturating the collected debris.

In applications where it is not necessary to filter organic oils from the run-off, the absorber pillow 38 may be removed from the basket 28 so that the run-off is free to pass through the perforated bottom 36 into the outlet drain 22. In such applications, the basket 28 may be eliminated and replaced by braces, not shown, but which may be mounted on the vertical wall 30 for horizontal extension into engagement with the bottom of the screen 44. It will be readily apparent that other means of support can be employed to maintain or position the screen for downward diagonal extension from the inlet mounting portion 45. Further, it will be apparent that the debris-collecting fence may be utilized in various drainage systems where it is important to maintain separation between solid and liquid materials and the method and apparatus of the present invention are readily conformable for use with storm drain systems along curbs or gutters as well as parking lots, runways and the like.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and subcombinations as are within their true spirit and scope.

We claim:

1. In apparatus for removing debris from water run-off wherein a chamber is provided with an upper inlet in the path of flow of the run-off and an outlet at a lower end of said chamber, the improvement comprising:
  a screen inclining downwardly through said chamber from said inlet to prevent passage of debris carried by the run-off through said screen; and
  a debris-collecting fence extending upwardly from said lower end of said chamber and disposed substantially beneath a lower end of said screen interspersed in a lower portion of said chamber between a first side for receiving debris from said screen and a second side in communication with said outlet, said fence including means for preventing the passage of debris through said first side of said fence into said outlet while selectively passing any water beneath said fence toward said outlet and blocking the return flow of water from said second side of said fence to said first side.

2. In apparatus according to claim 1 wherein said fence is comprised of a filter sheet and an impermeable membrane traversing said chamber beneath said screen.

3. In apparatus according to claim 2 wherein said fence includes a ballast member at a lower end thereof resting on a floor of said chamber.

4. In apparatus according to claim 3 wherein said ballast member is at the lower ends of said filter sheet and said impermeable membrane and resting is impermeable to passage of water therethrough.

5. In apparatus according to claim 1 wherein an upper support rod extends between opposite walls of said chamber for suspension of said fence therefrom.

6. In apparatus according to claim 1 wherein means is provided beneath said screen for absorbing organic matter from the run-off passing through said screen.

7. In apparatus according to claim 6 wherein said absorber means is in the form of a pillow extending beneath said screen and an open frame adapted to support said absorber means beneath said screen.

8. In apparatus according to claim 1 wherein said screen includes a tilted wire wedge screen.

9. In apparatus for removing organic matter and debris from water run-off wherein a chamber is provided with an upper inlet in the path of flow of the run-off with a screen inclining downwardly through said chamber from said inlet to prevent passage of debris carried by the run-off through said screen and an organic matter absorber disposed beneath said screen in the path of run-off passing through said screen, the improvement comprising:
  a run-off outlet at a lower end of said chamber; and
  a debris-collecting fence extending upwardly from said lower end and disposed beneath a lower end of said screen interspersed in a lower portion of said chamber between a first side for receiving debris from said screen and a second side in communication with said outlet, said fence including means for preventing the passage of debris through said first side of said fence into said outlet while selectively passing any water through said fence toward said outlet and blocking the return flow of water from said second side of said fence to said first side.

10. In apparatus according to claim 9 wherein said fence is comprised of a filter sheet and an impermeable membrane traversing said chamber beneath said screen.

11. In apparatus according to claim 10 wherein said fence includes an upper support rod extending between opposite walls of said chamber for suspension of said filter sheet and said impermeable membrane therefrom.

12. In apparatus according to claim 11 wherein said fence includes a ballast member at a lower end thereof resting on a floor of said chamber.

13. In apparatus according to claim 9 wherein said screen is mounted in overhanging relation to said absorber.

14. In apparatus according to claim 13 wherein an open frame supports said absorber beneath said screen.

15. In apparatus according to claim 14 wherein said absorber is in the form of a pillow extending beneath the substantial length and breadth of said screen.

16. A method for filtering debris and organic materials from water run-off comprising the steps:
  directing the run-off through an upper inlet of a chamber;
  directing the run-off downwardly onto an inclined filter which is sized to block the passage of debris through the filter;
  collecting the debris from the filter on one side of a barrier disposed substantially beneath a lower end of said filter while permitting the run-off to pass through an outlet at the lower end of said chamber on a second side of said barrier; and
  selectively passing any run-off water through said barrier towards said outlet while blocking the return flow of water from the outlet side to the debris side of said barrier.

17. The method according to claim 16 including the step of absorbing organic matter from the run-off after it passes through said filter.

\* \* \* \* \*